(12) United States Patent
Pedersen

(10) Patent No.: US 8,736,299 B1
(45) Date of Patent: May 27, 2014

(54) SETTING SECURITY FEATURES OF PROGRAMMABLE LOGIC DEVICES

(75) Inventor: Bruce B. Pedersen, Sunnyvale, CA (US)

(73) Assignee: Altera Corporation, San Jose, CA (US)

( * ) Notice: Subject to any disclaimer, the term of this patent is extended or adjusted under 35 U.S.C. 154(b) by 234 days.

(21) Appl. No.: 13/098,316

(22) Filed: Apr. 29, 2011

(51) Int. Cl.
*H03K 19/00* (2006.01)

(52) U.S. Cl.
USPC .................. 326/8; 326/38; 326/39; 713/187; 713/191

(58) Field of Classification Search
USPC .......... 326/8–9, 16, 37–41, 47; 713/168–191; 380/277–285
See application file for complete search history.

(56) References Cited

U.S. PATENT DOCUMENTS

| | | |
|---|---|---|
| 4,609,986 A | 9/1986 | Hartmann et al. |
| 4,617,479 A | 10/1986 | Hartmann et al. |
| 4,677,318 A | 6/1987 | Veenstra |
| 4,713,792 A | 12/1987 | Hartmann et al. |
| 4,774,421 A | 9/1988 | Hartmann et al. |
| 4,871,930 A | 10/1989 | Wong et al. |
| 4,899,067 A | 2/1990 | So et al. |
| 4,912,342 A | 3/1990 | Wong et al. |
| 5,033,084 A | 7/1991 | Beecher |
| 5,081,675 A | 1/1992 | Kittirutsunetorn |
| 5,121,006 A | 6/1992 | Pedersen |
| 5,220,214 A | 6/1993 | Pedersen |
| 5,260,610 A | 11/1993 | Pedersen et al. |
| 5,260,611 A | 11/1993 | Cliff et al. |
| 5,350,954 A | 9/1994 | Patel |
| 5,371,422 A | 12/1994 | Patel et al. |
| 5,388,157 A | 2/1995 | Austin |
| 5,406,627 A | 4/1995 | Thompson et al. |
| 5,450,022 A | 9/1995 | New |
| 5,479,512 A | 12/1995 | Weiss |
| 5,513,262 A | 4/1996 | van Rumpt et al. |
| 5,548,228 A | 8/1996 | Madurawe |
| 5,563,592 A | 10/1996 | Cliff et al. |
| 5,581,198 A | 12/1996 | Trimberger |
| 5,581,202 A | 12/1996 | Yano et al. |
| 5,636,281 A | 6/1997 | Antonini |
| 5,768,372 A | 6/1998 | Sung et al. |
| 5,915,017 A | 6/1999 | Sung et al. |
| 6,181,164 B1 | 1/2001 | Miller |

(Continued)

OTHER PUBLICATIONS

"Operating Requirements for Altera Devices," Altera, Data Sheet, Version 9.02, pp. 1-14 (Dec. 1999).

(Continued)

*Primary Examiner* — Alexander H Taningco
*Assistant Examiner* — Christopher Lo
(74) *Attorney, Agent, or Firm* — Ropes & Gray LLP

(57) ABSTRACT

Systems and methods are disclosed for allowing security features to be selectively enabled during device configuration. For example, a programmable integrated circuit device is provided that receives configuration data and security requirement data. Control circuitry compares enabled security features in the device against the security requirements, and can configure the programmable integrated circuit device with the configuration data or prevent such configuration. Control circuitry may also use the security requirement data to set security features within the device.

33 Claims, 4 Drawing Sheets

(56) References Cited

U.S. PATENT DOCUMENTS

| | | |
|---|---|---|
| 6,314,550 B1 | 11/2001 | Wang et al. |
| 6,651,155 B1 | 11/2003 | Bocchino et al. |
| 6,654,889 B1 * | 11/2003 | Trimberger .................. 713/191 |
| 6,980,649 B1 | 12/2005 | Batcher |
| 7,236,007 B1 | 6/2007 | Chang |
| 7,278,128 B1 * | 10/2007 | Trimberger .................. 716/117 |
| 7,389,429 B1 * | 6/2008 | Trimberger .................. 713/194 |
| 7,623,378 B1 * | 11/2009 | Wahlstrom et al. ...... 365/185.04 |
| 2009/0164727 A1 | 6/2009 | Penton et al. |
| 2010/0141295 A1 * | 6/2010 | Fulks, III ......................... 326/8 |
| 2011/0078379 A1 | 3/2011 | Iida et al. |
| 2012/0278906 A1 | 11/2012 | Pedersen |

OTHER PUBLICATIONS

Minnick, R.C., "A Survey of Microcellular Research," Journal of the Association for Computing Machinery, vol. 14, No. 2, pp. 203-241 (Apr. 1967).

Mukhopadhyay, A., "Recent Developments in Switching Theory," Academic Press, New York, Chapters VI and IX, pp. 229-254 and 369-422 (1971).

Plummer, James D. et al., "Silicon VLSI Technology: Fundamentals, Practice and Modeling," Prentice Hall, Upper Saddle River, New Jersey, pp. 466-468. (2000).

Wahlstrom, S.E., "Programmable logic arrays-cheaper by the millions," Electronics, pp. 90-95 (Dec. 11, 1967).

* cited by examiner

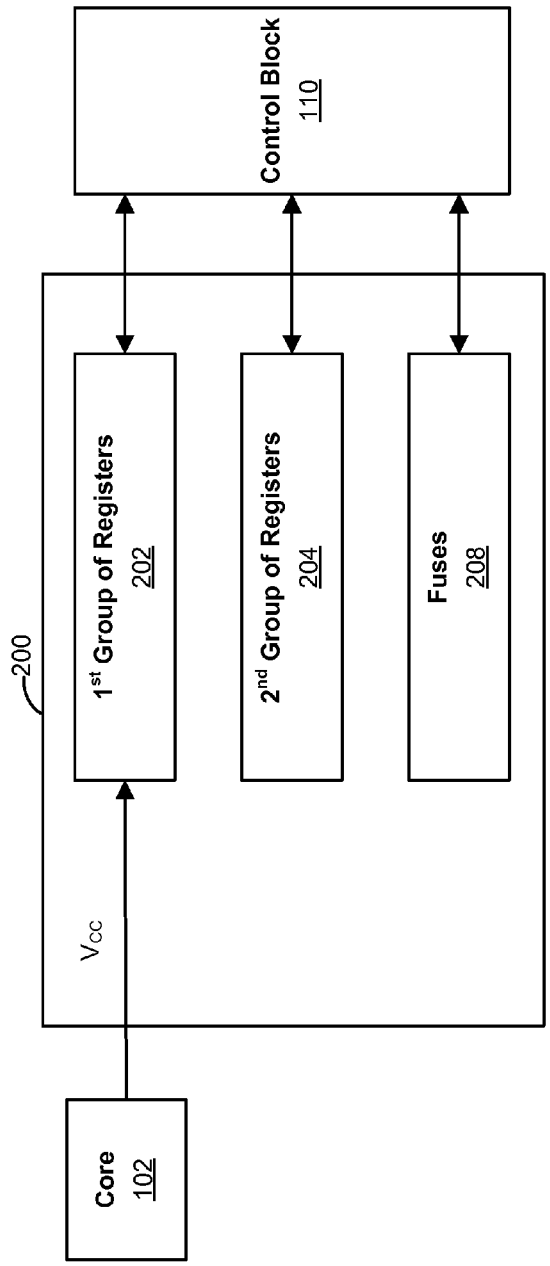
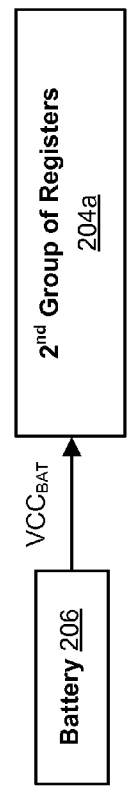
FIG. 2
FIG. 2A

SETTING SECURITY FEATURES OF PROGRAMMABLE LOGIC DEVICES

BACKGROUND OF THE DISCLOSURE

In one class of known PLDs, each device has a large number of logic gates, and a user programs the device to assume a particular configuration of those logic gates, frequently using a software tool provided by the manufacturer of the device, with the software tool being executed on a computer having an adapter into which the device is inserted. Early generations of such devices typically used some form of programmable read only memory ("PROM") technology to store the configuration data produced by the software tool. In those early devices, the software tool caused the computer to "burn" the pattern into the PROM storage by fusing fusible links. Later, programmable logic devices that store their configuration data in static random access memory ("SRAM") storage became available and remain prevalent. However, SRAM storage is volatile; it does not retain its contents when power is lost. Therefore, programmable logic devices based on SRAM technology are used with nonvolatile storage as well, to retain the configuration programming data during times that the device is switched off or otherwise not provided with power.

Many applications employing PLDs have critical security requirements. For example, governments and corporations invest heavily in critical networking infrastructures, sophisticated weapon systems, and secure banking systems. Additionally, the circuit and algorithm designs that are implemented in PLDs represent important intellectual property for developers, and thus need to be secured against competitors who seek to copy or interfere with these designs. A number of security features may be used to mitigate against reverse engineering, tampering, and other security risks, such as various levels of encryption. These features are typically fixed in the silicon of the programmable logic device at the time of manufacture. As a result, PLD manufacturers must produce a different device for each security level, and customers must know at the time of purchase exactly which security features are required or desirable for their application. Additionally, devices with different security levels are subject to different export regulations, complicating sale and distribution of these devices.

SUMMARY OF THE DISCLOSURE

The present disclosure relates to systems and methods for setting one or more security features of a programmable integrated circuit device. These systems and methods address the shortcomings of existing technology by allowing security features to be selectively enabled by the user during device configuration. For example, security features in the programmed device can be enabled via the programming software through a test access port or configuration port after shipment, instead of set in the silicon at the time of manufacture. Shifting responsibility for device security from the hardware to the software may similarly shift export controls from the hardware to the software, allowing manufacturers to produce and sell a single silicon device while providing different software packages for implementing different security features.

Therefore, in accordance with certain embodiments, there is provided a programmable integrated circuit device having a non-volatile memory that stores a value of at least one bit. This value is indicative of security features enabled in the programmable integrated circuit device. Configuration data for the programmable integrated circuit device is provided to an input, with the configuration data including security requirement data. Control circuitry determines security requirements based on the security requirement data, compares the value stored in the non-volatile memory against the security requirements, and when the value stored in the non-volatile memory satisfies the security requirements, configures the programmable integrated circuit device with the configuration data.

In accordance with additional embodiments, the security requirements are not satisfied unless the value stored in the non-volatile memory indicates that: JTAG ports associated with the programmable integrated circuit device are disabled, a test mode of the programmable integrated circuit device is disabled, and/or a test mode of the programmable integrated circuit device has not been previously enabled.

There is also provided a programmable integrated circuit device having a memory configured to store a value of at least one bit. Configuration data for the programmable integrated circuit device is provided to an input, with the configuration data including security data. Control circuitry reads first security data included with first configuration data provided to the input, and, based on the first security data, stores a value in the memory. The control circuitry also configures the programmable integrated circuit device according to the first configuration data. Logic circuitry enables one or more security features based on the value stored in the memory. In some embodiments, the logic circuitry disables JTAG ports associated with the programmable integrated circuit device based on the value stored in the memory. In additional embodiments, the memory is a non-volatile memory and the control circuitry may, after reading the first security data, read second security data included with second configuration data provided to the input, compare the second security data against the value stored in the memory, and, based on the comparison, prevent configuration of the programmable integrated circuit device according to the second configuration data. In some embodiments, the memory is a volatile memory which is cleared in response to a secure reset event.

There is also provided a programmable integrated circuit device having a non-volatile memory that is configured to store a value of at least one bit, the value indicative of security features enabled in the programmable integrated circuit device. The device also has an input for configuration data, and a test access port. Security requirement data is provided to the test access port, and compared against the value stored in the non-volatile memory. When the value stored in the non-volatile memory is compatible with the security requirement data, the device is configured according to configuration data provided to the configuration input. In some embodiments, the test access port is a JTAG port. In some embodiments, the security requirement data is provided by a processor executing a method provided by a non-transitory computer readable medium that is licensed to an end user by a manufacturer of the programmable integrated circuit device. In some embodiments, a user of the computer readable medium is validated prior to providing security requirement data to the test access port.

There is also provided a programmable integrated circuit device having a non-volatile memory that is configured to store a value of at least one bit. The device also has an input for configuration data, and a test access port. Control circuitry is configured to read security requirement data provided to the test access port of the programmable integrated circuit device and store a value in the non-volatile memory in response to receiving the security requirement data. One or more security features are enabled based on the value stored in the nonvolatile memory, and configuration data is received at the configuration input. In some embodiments, the test access port is a JTAG port.

Methods of configuring such programmable integrated circuit devices are also provided.

BRIEF DESCRIPTION OF THE DRAWINGS

Further features of the disclosure, its nature and various advantages will be apparent upon consideration of the following detailed description, taken in conjunction with the accompanying drawings, in which like reference characters refer to like parts throughout, and in which:

FIG. 2 is a block diagram of memory arranged in registers, according to an illustrative embodiment;

FIG. 2A is a block diagram of a particular non-volatile memory arrangement, according to an illustrative embodiment;

DETAILED DESCRIPTION OF THE INVENTION

Generally, programmable logic devices, such as FPGAs, have three stages at which security features may be implemented; a manufacturing stage, a configuration stage and a user mode stage. At the manufacturing stage, the device is built by setting and connecting components using microfabrication processes; security features implemented at this stage are "hardwired" into the device. The configuration stage may include various operations, such as initialization, configuration, and startup operations, that lead up to the user mode stage. The user mode stage generally refers to a stage of operation after a device's configuration has successfully completed where the device is generally operating based on the logic circuitry that was configured during the configuration stage; security features implemented at this stage are programmed as part of the user design, and may not secure the design itself from copying or tampering.

Described herein are systems and methods for providing security requirements and features at the configuration stage. This approach may be used to ensure that a high security design is not loaded into a device that lacks necessary security features. Additionally, a low security design may be prevented from being loaded into a high security device, which could protect sensitive proprietary configuration data for various commonly-used functions that were included in the device by the original manufacturer or an intermediate supplier.

Figure 1:
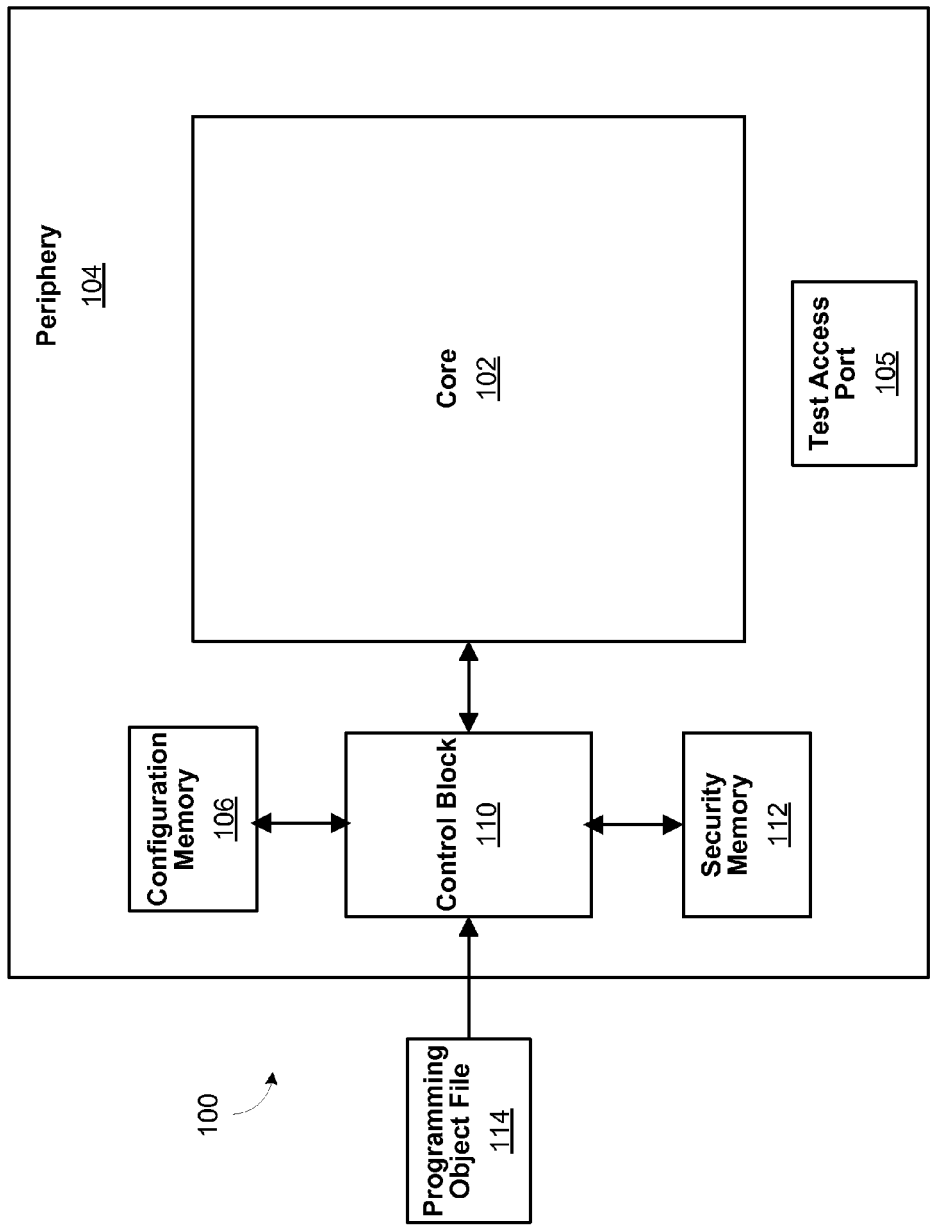
FIG. 1 is a block diagram of a programmable logic device, according to an illustrative embodiment.

To illustrate a setting in which the present techniques may be applied, FIG. 1 shows illustrative device 100 that includes core 102 and periphery 104. Periphery 104 includes test access port 105, which may be, for example, a JTAG port. Core 102 includes programmable logic circuitry that can be configured according to configuration data that is programmed by a user. For example, core 102 can be configured to handle a particular type of digital signal processing, control or communications algorithm, or any other suitable operation as programmed by a user. In one embodiment, device 100 is an FPGA; however, device 100 may be any other suitable form of a circuitry. For example, device 100 may be an application-specific integrated circuit (ASIC) or any suitable programmable logic device. It should also be understood that device 100 may be a combination of devices, such as an FPGA and an ASIC, and/or may include additional, stand-alone circuit components.

In some embodiments, periphery 104 includes control block 110, configuration memory 106 and security memory 112. Control block 110 generally controls the configuration of core 102 and may handle various other tasks associated with the configuration of core 102, such as encryption, decryption, compression, decompression, the enabling and disabling of security features, and/or any other suitable function. Security memory 112 may include various types of volatile and nonvolatile memory for storing, for example, encryption keys, security feature information, and/or security feature configurations. Various embodiments of security memory 112 will be discussed in greater detail below with regard to FIG. 2.

In some embodiments, control block 110 receives data arranged as programming object file (POF) 114 from an external memory. This external memory may be, for example, Flash memory included in a specialized configuration device or other device. POF 114 includes configuration data from a user or manufacturer that may be used to configure core 102 and/or various security features, as described below. POF 114 typically contains proprietary designs that are used to configure the functionality of device 100. The configuration of device 100 may occur upon powering up the device, rebooting, or at some other re-programming time. For example, upon powering up, the configuration data will be sent via POF 114 to device 100. The configuration data may be encrypted in order to prevent copying when the data is in transit, e.g., using an encryption system (not shown). In certain embodiments, POF 114 is generated by software running on a personal computer or other processing device, then stored in a configuration device.

The encrypted or unencrypted POF 114 is sent to device 100 where it is decrypted by a decoder, if necessary, and stored in configuration memory 106. The configuration data is used to configure the functionality of core 102. After configuration, core 102 may begin operating on input data. When in operation, core 102 may store internal data, e.g., in data registers, RAM, or other suitable storage. This internal data may reflect specific aspects of the configuration data. Additionally, in non-programmable devices, the internal data may reflect proprietary aspects of the circuit design.

FIG. 2 shows illustrative memory 200, which may be substantially similar to or included as security memory 112 of FIG. 1. Memory 200 may include first group of registers 202, second group of registers 204, and fuses 208. First group of registers 202 may receive power from core 102 (as illustrated in FIG. 2 by $V_{CC}$) or may be powered by the same power supply as core 102. Second group of registers 204 may be referred to as "non-volatile memory" because the registers may maintain their values even when the core voltage, $V_{CC}$, is removed. Second group of registers 204 may include any type of writable non-volatile memory, such as EEPROM, flash memory, ferroelectric, RAM, etc. In some embodiments, some or all of the non-volatile memory of second group of registers 204 is backed by a battery. For example, FIG. 2A depicts battery-backed non-volatile memory 204a, which receives power from battery 206 as illustrated by $V_{CCBAT}$. Battery 206 may be any suitable type of battery. Memory 200 also includes fuses 208, which, in some embodiments, create an open circuit when broken and cannot be re-fused. Non-volatile memory, such as fuses, may be preferred in applications in which batteries are less feasible due to limitations in chemical content for long-term storage. In some embodiments, memory 200 is located in periphery 104 of FIG. 1 (e.g., as security memory 112). In other embodiments, memory 200 may be located in core 102 in addition to, or instead of, being placed in periphery 104.

As suggested above, registers 202, 204 and 206 of memory 200 may be used to store bits or patterns of bits that are associated with different security features. For example, if a particular bit or pattern of bits is set, then a particular security feature will be enabled in device 100. One specific example of a security feature is disabling an FPGA's JTAG ports, and additional examples are described in detail below with reference to FIGS. 3 and 4.

In one embodiment, some of the bits in memory 200 are "sticky bits" that relate to security features are implemented redundantly in triplicate groups and backed up using a shadow register that is powered by logic in core 102. For example, identical bit patterns may be stored in each of first group of registers 202, second group of registers 204, fuses 208, and in registers in core 102. If any of these bits are set high, the corresponding other bits would be forced high as well. Cycling only one of the power supplies would restore the value in the register that was cycled from a corresponding register that was not cycled. Clearing a sticky bit may require cycling all of the associated power supplies. In some embodiments, clearing a sticky bit relating to a security feature (e.g., an anti-tamper option) may require zeroing the volatile key. In some applications, it may be advantageous to clear a sticky bit without zeroing the volatile key, or zero the volatile key without clearing the sticky bit.

In some applications, certain bits in memory 200 may control anti-tamper options in the device 100, as discussed in copending, commonly-assigned U.S. patent application Ser. No. 13/098,074, which is hereby incorporated by reference herein in its entirety. In some applications, certain bits in memory 200 may be used to store an encryption key that is used by control block 110 to decrypt and/or encrypt, for example, the configuration data in POF 114 of FIG. 1. In some embodiments, the encryption key is based on the advanced encryption standard (AES). Further details regarding various embodiments of encryption keys and their use in encryption and decryption are discussed in greater detail in copending, commonly-assigned U.S. patent application Ser. Nos. 13/097,205 and 13/098,315, respectively, each of which is incorporated by reference herein in its entirety.

The device 100 of FIG. 1 is an exemplary setting in which to apply the techniques disclosed herein for evaluating and setting security features at the configuration stage. Illustrative embodiments of these techniques are presented as processes 300 and 400 in FIGS. 3 and 4, respectively. These processes may be carried out by circuitry included in control block 110, distributed between multiple processing locations within device 100, and may be implemented singly or in combination. In practice, one or more steps shown in process 300 or process 400 may be combined with other steps, preformed in any suitable order, performed in parallel (e.g., simultaneously or substantially simultaneously), or removed. Process 300 and process 400 may be implemented using any suitable combination of hardware and/or software in any suitable fashion.

Figure 3:
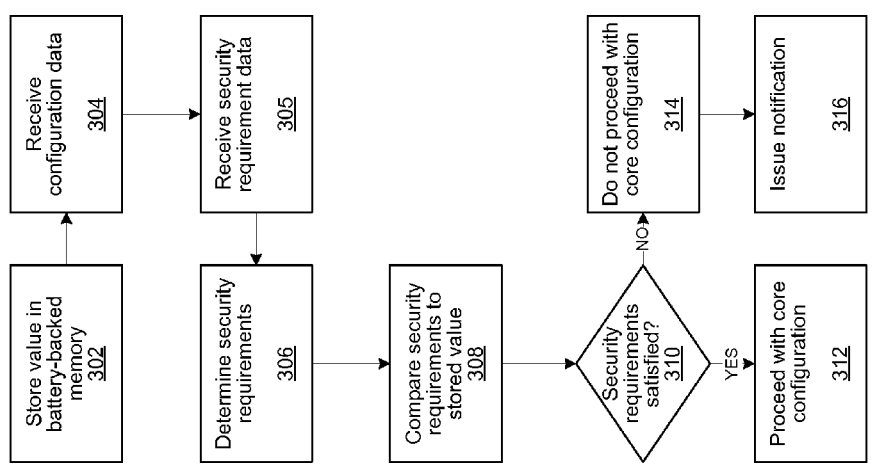
FIG. 3 is a flow chart of illustrative steps performed to determine whether a device satisfies the security requirements provided in a data stream, according to an illustrative embodiment.

FIG. 3 depicts illustrative process 300 for determining whether a programmable integrated circuit device satisfies the security requirements provided in a data stream (such as POF 114, or a data stream supplied to test access port 105 of FIG. 1). At step 302, a value of at least one bit is stored in a non-volatile memory (included, for example, in memory 200 of FIG. 2). The value stored at step 302 represents the security features enabled in the programmable integrated circuit device. Step 302 may be performed when the security features are implemented in the silicon of the device at the time of manufacturing, when the security features are enabled by instructions in a previous configuration data stream, or when the security features are activated by a write operation executed through JTAG ports, to name a few examples. For example, a user-provided security key may be written to device 100 through JTAG ports prior to configuration. The value stored at step 302 may indicate that such a key has been loaded into device 100. The value stored at step 302 may be stored in one or more sticky bits, which may be used to enable any of a multitude of security features. A number of possible security features may be indicated by the value stored at step 302, including one or more of the following examples.

1. Setting a tamper protection bit. As discussed above, in some embodiments, an encryption key is loaded into device 100 via JTAG ports and stored in non-volatile memory before configuration. Device 100 may include a tamper protection bit, which, when set, prevents the encryption key from being rewritten. After the tamper protection bit is set, only configuration files that are encrypted with the stored encryption key may be accepted by device 100 and used to configure core 102. For example, once an encryption key is loaded and the tamper protection bit is set, the device will not accept an unencrypted POF. When the tamper protection bit is not set, device 100 can be configured with either an encrypted POF or an unencrypted POF.

2. Disabling access to JTAG ports. The JTAG interface is often useful during development and testing of user designs. However, a tamperer may use JTAG ports to monitor operation of the configured device to reverse engineer the design, determine an encryption key, or otherwise interfere with device operation. In some high security applications, JTAG port access must be disabled. In some embodiments, JTAG port access may be disabled even from the first stages of initialization and power-on of device 100. I/O access to the JTAG port may also be prevented. A sticky security bit may be used to set this security feature. This feature may be disabled by a secure reset operation.

3. Disabling test mode. The JTAG test protocol uses five connector pins to control a serial data stream during device testing, according to one embodiment. Connecting various combinations of these pins high and low may disable test mode entirely, preventing a tamperer from using JTAG queries to write data to or read data from device 100. This feature may be disabled by a secure reset operation.

4. Enabling evolving encryption keys. In some embodiments, every block of configuration or other data may be encrypted using a different "evolving" key such that the keys for encrypting subsequent blocks are related. The use of evolving encryption key blocks is discussed in copending, commonly-assigned U.S. patent application Ser. No. 13/098,315, which is hereby incorporated by reference herein in its entirety.

5. Setting a sticky encryption bit. In some embodiments, when a designated sticky encryption bit is set, data from POF 114 may only be loaded onto device 100 and/or used to configure device 100 when POF 114 is encrypted. If the sticky encryption bit is set, the encryption/decryption keys used should not be zeroed. In some embodiments, test mode is still enabled while the sticky encryption bit is set to enable device testing. The sticky encryption bit may be set by POF 114 when POF 114 is encrypted, and may be ignored when POF 114 is not encrypted.

6. Preventing encryption key load. In some embodiments, when a designated sticky OTP volatile key is set, no key can be programmed into the volatile key register (regardless of whether the register has been previously zeroed). Setting the sticky OTP volatile key bit does not necessarily prevent zeroization of the volatile key register. When the sticky encryption bit (discussed above) is also set, device 100 is effectively disabled after reset if the volatile key has been zeroed.

7. Setting a sticky secure key bit. This bit may be set when the volatile key was loaded using a secure key process, such as a one-way hash (e.g., when the upper 128 bits of the volatile key are loaded with $E^{-1}(0^{127}1^1)$).

8. Allowing shutdown permission. In some embodiments, a designated sticky shutdown permission key may be set to allow a user design to initiate a secure shutdown from the core configuration fabric of device 100.

9. Allowing rekeying. In some embodiments, a designated sticky rekey permission bit may be set to allow a user design to load a volatile key from the core configuration fabric of device 100. The sticky rekey permission bit may be ignored if POF 114 is not encrypted. In some embodiments, a sticky rekey permission bit may be set in device 100, and may be compared against a corresponding bit in POF 114; rekey permission will only be given if both POF 114 and device 100 have their respective sticky rekey permission bits set. Processes for evaluating security requirements are described below.

10. Performing verification before entering user mode. To verify the data transmitted in POF 114 before entering user mode, the end of the configuration mode period may be delayed for the duration of a full CRAM readback cycle to allow a proper cyclic redundancy check (CRC) to be performed. If the CRC fails, a secure reset of device 100 may be performed. A sticky bit may be used to set this security feature.

11. Verifying zeroization. In some embodiments, a designated sticky zeroization delay bit may be set to delay for a full CRAM read-back cycle after zeroization of device 100 to verify that the CRAM and CSRs are zeroed. If not, the zeroization cycles may be repeated under all registers are zeroed.

12. Preventing replay attacks. A replay attack occurs when a previously-loaded POF is sent to device 100. For example, a user could patch a bug in device 100 when configured as a router, only to have an adversary "replay" an old POF to restore the bug and allow the router to be hacked. In some embodiments, replay attacks may be resisted by requiring that each POF include a POF sequence number (e.g., in the first 32 bits of the first 128-bit AES data block) and a replay protect option bit. Device 100 may store the value of the sequence number of the last POF loaded in a non-volatile register (such as memory 200). If the received POF has the replay protect bit set, the POF should not be accepted (and decryption may be stopped) unless the POF's associated sequence number is greater than or equal to the value stored in the last sequence number register of device 100. If the POF is accepted and loaded without error, the last sequence number register of device 100 may be set to the value contained in the POF. When a designated sticky replay protect bit is set, POFs that do not include an associated POF Replay Protect bit are not allowed to load in device 100. If POF 114 is not encrypted, this replay protect feature may be disabled. Processes for evaluating security requirements, such as replay protect, are described below.

Once a value is stored at step 302, the process 300 proceeds to step 304 at which configuration data for the programmable integrated circuit device is received (e.g., via an input in communication with control block 110 of FIG. 1). In some embodiments, the configuration data is transmitted as POF 114 (FIG. 1), and is received by control block 110 or other control circuitry. At step 305, security requirement data is received. In some embodiments, steps 304 and 305 are merged and the configuration data received at step 304 includes the security requirement data. For example, in some embodiments, the configuration data is encrypted in POF 114 and the security requirement data is read by the control block 110 from a predetermined portion of the POF that has been decrypted (e.g., from the first decrypted block). In some embodiments, the security requirement data is transmitted to device 100 separately from the POF 114, such as through a test access port (e.g., a JTAG port) of device 100.

At step 306, security requirements are determined based on the security requirement data. The security requirements specify the necessary and/or sufficient security features that should be enabled in device 100 before the device is configured according to the configuration data received at step 304. To evaluate whether device 100 and the security requirements are compatible, the process 300 proceeds to step 308 to compare the value stored in the non-volatile memory (at step 302) against the security requirements (determined at step 306). This comparison may be a bitwise comparison (e.g., comparing a single security option bit in the security data to a single security option bit of the stored value) or may involve one or more logical operations (e.g., security requirements that specify multiple security features that may or must be enabled in combination). For example, in one suitable approach, sticky bits stored in device 100 may be compared to corresponding security requirement bits transmitted in POF 114 or in a data stream directed to a JTAG port of device 100. When the sticky bits stored in device 100 are of a fixed pattern (i.e., they cannot be modified except when reconfiguring device 100), one suitable comparison may involve comparing the sticky bit pattern to a security requirement bit pattern in POF 114. The security requirements of step 306 may include any of the security features described above with reference to step 302, or any additional security features such as specific types of encryption and anti-tamper operations.

At step 310, the result of the comparison at step 308 is used to determine whether the value stored in the non-volatile memory satisfies the security requirements. For example, in some embodiments, the security requirements are not satisfied unless the value stored in the non-volatile memory indicates that JTAG ports associated with the device 100 are disabled. In some embodiments, the security requirements are not satisfied unless the value stored in the non-volatile memory indicates that a test mode of the programmable integrated circuit device is disabled and/or has not been previously enabled.

As described above, a range of security features may be implemented using steps 302-310. For example, a sticky encryption test may be implemented. When POF 114 is encrypted, POF 114 will not load in device 100 unless a sticky encryption bit is set. This may advantageously prevent POF 114 from being loaded into device 100 if POF 114 may be followed by a non-encrypted POF. If POF 114 is not encrypted, the sticky encryption test may be bypassed or passed. Another example is a sticky security test, in which POF 114 is prevented from loading unless a sticky security bit is already set in device 100. The sticky security test prevents POF 114 from being loaded into device 100 if POF 114 may be followed by a POF that enables a test mode. Setting a sticky security bit in device 100 may prevent device 100 from being used in test mode from the beginning of power-initialization. The sticky security bit may enable/disable test mode, JTAG port access, or both. In some embodiments, different sticky security bits are used to enable/disable test mode and JTAG access.

If the security requirements are satisfied by device 100, the process 300 proceeds to step 312 and device 100 is configured with the user design according to the configuration data received at step 304. If the security requirements are not satisfied by device 100, process 300 proceeds to step 314 and prevents configuration of core 102 with the configuration data received at step 304. Optionally, process 300 may then continue to step 316 and issue a notification or alarm that the configuration data cannot be loaded into device 100. Instead of or in addition to a notification at step 316, when the security requirements are not satisfied by device 100, a decryption key in device 100 may be cleared or zeroed, or a device kill sequence may be triggered. Examples of suitable device kill sequences are described in copending, commonly-assigned U.S. patent application Ser. No. 13/097,816, which is hereby incorporated by reference herein in its entirety.

Figure 4:
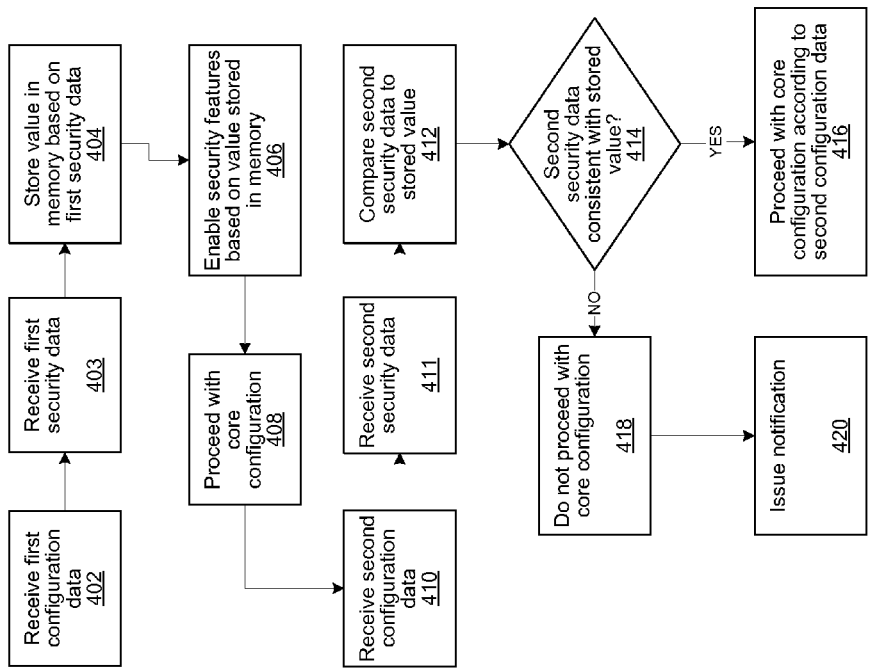
FIG. 4 is a flow chart of illustrative steps performed to enable security features of a device via a data stream, according to an illustrative embodiment.

FIG. 4 depicts illustrative process 400 for enabling security features of a programmable integrated circuit device via a data stream (such as POF 114, or a data stream supplied to test access port 105 of FIG. 1). At step 402, first configuration data for the device 100 is received. At step 403, security requirement data is received. In some embodiments, steps 402 and 403 are merged and the configuration data received at step 403 includes the security requirement data. For example, in some embodiments, the configuration data is encrypted in POF 114 and the security requirement data is read by the control block 110 from a predetermined portion of the POF that has been decrypted (e.g., from the first decrypted block). In some embodiments, the security requirement data is transmitted to device 100 through test access port 105 (e.g., a JTAG port) of device 100. Steps 402 and 403 may take the form of any of the embodiments described above with reference to steps 304 and 305 of process 300 (FIG. 3), including decrypted an encrypted data stream and extracting the security data. Once the first security data is received, process 400 proceeds to step 404 and stores one or more values representative of at least some of the security data in a memory. This memory may be, for example, any of the types of memory described with reference to memory 200, including a non-volatile memory, a volatile memory, a non-volatile memory such as a fuse, or a combination thereof. The type(s) of memory used to store the value at step 404 may be selected by the user or by the device manufacturer for different purposes, as discussed below. Next, the value stored at step 404 is used at step 406 to enable one or more security features in the programmable integrated circuit device. Examples of some such security features were described above with reference to process 300 (FIG. 3), and include setting a tamper protection bit, disabling access to JTAG ports and disabling a test mode of the device, among others.

The type and duration of the security features enabled at step 406 may depend on the type of memory used to store the value at step 404. For example, if the value associated with a particular security feature is stored in volatile memory (such as first group of registers 202 of FIG. 2), that security feature may be enabled as long as the first configuration data is loaded into configuration memory 106 and until a secure reset event occurs. A secure reset event is a memory operation that clears the memory of data from the previous configuration, such as any one or more of configuration memory 106, security memory 112, other memory registers and blocks, and encryption keys stored in volatile memory.

In another example, the value stored at step 404 may be stored in a non-volatile memory (such as second group of registers 204 of FIG. 2). In this example, a particular security feature associated with the stored value will be enabled even though the core power supply is interrupted. When the non-volatile memory is a battery-backed memory (as illustrated in FIG. 2A), the security feature associated with the stored value will be enabled as long as the power supply from battery 206, $V_{CCBATT}$, continues. Thus, the security feature may remain enabled through subsequent reconfigurations of core 102 with (possibly different) configuration data. In some embodiments, enabling security features according to the first security data supplied in the first configuration data stream constrains which user designs can be loaded into device 100 in subsequent configurations (as discussed below with reference to step 414). When the non-volatile bits are replicated in volatile memory powered by the core logic power supply, clearing the value stored in the non-volatile bits may require cycling the core logic power supply. If the non-volatile bits are battery-backed (FIG. 2A), the battery 206 may need to be cycled at the same time as the core logic power supply.

In a third example, the value stored at step 404 may be stored in a non-volatile memory, such as a fuse in fuses 208 of FIG. 2. Because the fuse cannot be reset, any future designs loaded into device 100 must be consistent with the security features enabled by the fused bits. This constraint is discussed below with respect to step 414.

Once a value has been stored in memory at step 404, and one or more security features have been enabled at step 406, the process 400 proceeds to step 408 and core 102 is configured with the user design according to the first configuration data. Once configuration is complete, device 100 may enter user mode, and may remain in user mode until some kind of error condition occurs or a subsequent configuration attempt is made.

Steps 410 onward of process 400 illustrate one way in which the device 100 might operate in response to a subsequent configuration attempt. At step 410, second configuration data is received, and at step 411, second security data is received. This second configuration data may represent, for example, a second user design supplied via POF 114 to an input in communication with control block 110 (FIG. 1). As described above with reference to steps 402 and 403, steps 410 and 411 may be combined in some embodiments (e.g., second security data is received as part of second configuration data). In some embodiments, the second configuration data and the second security data may be received at different ports in device 100 (e.g., a configuration data port and a test access port, respectively). Because first configuration data was previously received (at step 402) and a value was previously stored in memory based on the first security data (step 404), certain security features may be enabled at the time that the second security data is received. Thus, at step 412, the second security data is compared to the stored value, and at step 414, it is determined whether the second security data is consistent with the stored value. In this context, "consistent with the stored value" may refer to any relationship between the security data and the stored value that allows device 100 to proceed with configuring core 102 with the second configuration data. The following examples illustrate two example conditions under which the second security data may be determined to be consistent with the stored value at step 414:

1. The value was stored in volatile memory at step 404 and a secure reset event occurred thereafter. In this case, the security features enabled by the stored value will have been cleared, and the second security data can be used to store a new value in memory to enable corresponding security features.
2. The value was stored in non-volatile memory at step 404 and the second security data requires the security features of the first security data (and possibly additional security features). In this case, the second security data is specifying a "higher" security level than the first security data, which can be achieved by enabling additional security features (such as disabling JTAG port access when not previously disabled). In such embodiments, the security features enabled at step 406 prevent reconfiguration of device 100 with any user design that has a "lower" security level than the first configuration data.

If the second security data is determined to be consistent with the stored value at step 414, the process 400 proceeds to step 416 and configures core 102 according to the second configuration data. Additionally, any security features specified by the second security data are enabled by storing the appropriate values in the appropriate memory, as described above with reference to step 406. However, if the second security data is determined to be inconsistent with the stored value at step 414, re-configuration of device 100 according to the second configuration data is prevented at step 418. Optionally, a notification or alarm is issued at step 420, indicating that the second attempted configuration has failed. Step 420 may also include a zeroization or other security response.

By enabling security features in the device 100 via POF 114 (FIG. 1), process 400 and similar embodiments advantageously allow user designs to "operate through" faults (such as battery failure or detection of a tamper event), rather than destroying the user design. For example, in aircraft control applications, "killing" a device upon occurrence of a fault or detecting of a potential tampering event may seriously compromise the safety and reliability of the aircraft. In such sensitive applications, certain security features and registers may be reset or cleared when a fault occurs, then device 100 may reload POF 114 and thereby reconfigure the user design and re-enable the security features.

In some embodiments, configuration and/or security requirement data are provided to device 100 by a general or special purpose computer executing instructions stored in software or other non-transitory computer-readable media. The computer-readable medium may be licensed to an end user by a manufacturer of device 100. In some embodiments, device 100 is configured with logic circuitry to validate a user of the computer readable medium prior to providing security requirement data to device 100 (e.g., via POF 114 or test access port 105). This validation could take the form of a password, security key, physical token, or other user validation mechanism.

Figure 5:
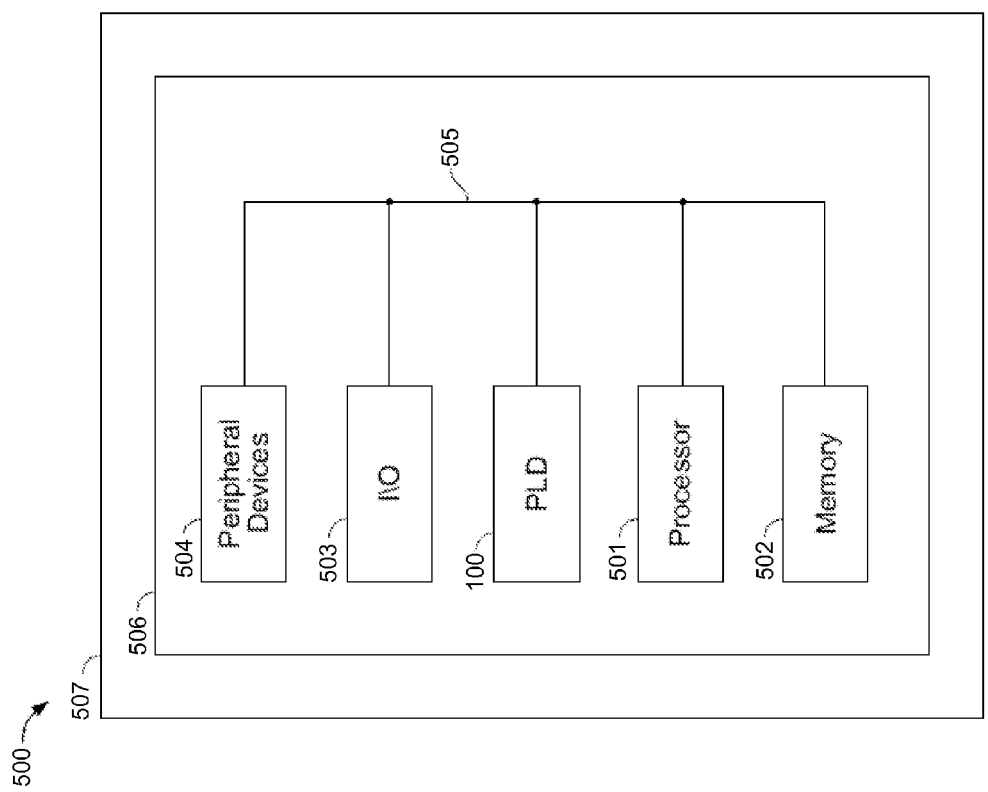
FIG. 5 is a simplified block diagram of an illustrative system employing a programmable logic device incorporating the present invention.

A device, such as device 100, programmed according to any embodiment of the present invention may be used in many kinds of electronic devices. One possible use is in data processing system 500 shown in FIG. 5. Data processing system 500 may include one or more of the following components: processor 501; memory 502; I/O circuitry 503; and peripheral devices 504. These components are coupled together by system bus 505 and are populated on circuit board 906 which is contained in end-user system 507.

System 500 can be used in a wide variety of applications, such as computer networking, data networking, instrumentation, video processing, digital signal processing, or any other application where the advantage of using programmable or reprogrammable logic is desirable. Device 100 can be used to perform a variety of different logic functions. For example, device 100 can be configured as a processor or controller that works in cooperation with processor 501. Device 100 may also be used as an arbiter for arbitrating access to shared resources in system 500. In yet another example, device 100 can be configured as an interface between processor 501 and one of the other components of system 500.

It will be understood that the foregoing is only illustrative of the principles of the invention, and that various modifications can be made by those skilled in the art without departing from the scope and spirit of the invention. One skilled in the art will appreciate that the present invention can be practiced by other than the described embodiments, which are presented for purposes of illustration and not of limitation, and the present invention is limited only by the claims that follow.

What is claimed is:

1. A programmable integrated circuit device, comprising:
a non-volatile memory for storing a value of at least one bit, the value representing a first set of security feature settings enabled in the programmable integrated circuit device;
an input for receiving configuration data for the programmable integrated circuit device, the configuration data including security requirement data representing a second set of security feature settings required by the configuration data on the programmable integrated circuit device; and
control circuitry configured to:
compare the value stored in the non-volatile memory against the security requirement data, and
configure the programmable integrated circuit device with the configuration data in response to a match between the value stored in the non-volatile memory and the security requirement data, wherein the first set of security feature settings comprises one or more security operations selectively enabled on the programmable integrated circuit device, and the first set of security feature settings is enabled in the device prior to the device receiving the configuration data.

2. The programmable integrated circuit device of claim 1, wherein the control circuitry is further configured to identify a match between the value stored in the non-volatile memory and the security requirement data when the value stored in the non-volatile memory indicates that JTAG ports associated with the programmable integrated circuit device are disabled.

3. The programmable integrated circuit device of claim 1, wherein the control circuitry is further configured to identify a match between the value stored in the non-volatile memory and the security requirement data when the value stored in the non-volatile memory indicates that a test mode of the programmable integrated circuit device is disabled.

4. The programmable integrated circuit device of claim 3, wherein the control circuitry is further configured to identify a match between the value stored in the non-volatile memory and the security requirement data when the value stored in the non-volatile memory indicates that a test mode of the programmable integrated circuit device has not been previously enabled.

5. A method of configuring a programmable integrated circuit device, comprising:

storing a value of at least one bit in a non-volatile memory, the value representing a first set of security feature settings enabled in the programmable integrated circuit device;

receiving configuration data for the programmable integrated circuit device, the configuration data including security requirement data representing a second set of security feature settings required by the configuration data on the programmable integrated circuit device;

comparing the value stored in the non-volatile memory against the security requirement data; and configuring the programmable integrated circuit device with the configuration data in response to a match between the value stored in the non-volatile memory and the security requirement data, wherein the first set of security feature settings comprises one or more security operations selectively enabled on the programmable integrated circuit device, and the first set of security feature settings is enabled in the device prior to the device receiving the configuration data.

6. The method of claim 5 further comprising identifying a match between the value stored in the non-volatile memory and the security requirement data when the value stored in the non-volatile memory indicates that JTAG ports associated with the programmable integrated circuit device are disabled.

7. The method of claim 5 further comprising identifying a match between the value stored in the non-volatile memory and the security requirement data when the value stored in the non-volatile memory indicates that a test mode of the programmable integrated circuit device is disabled.

8. The method of claim 7 further comprising identifying a match between the value stored in the non-volatile memory and the security requirement data when the value stored in the non-volatile memory indicates that a test mode of the programmable integrated circuit device has not been previously enabled.

9. A method for configuring a programmable integrated circuit device, the method comprising:

receiving security requirement data at a test access port of the programmable integrated circuit device, wherein the programmable integrated circuit device is configured to compare the security requirement data to a value stored in a non-volatile memory of the programmable integrated circuit device, the value representing a first set of security feature settings enabled in the programmable integrated circuit device and the security requirement data representing a second set of security feature settings required on the programmable integrated circuit device; and receiving configuration data at a configuration input of the programmable integrated circuit device responsive to a determination that the value stored in the non-volatile memory is compatible with the security requirement data, wherein the first set of security feature settings comprises one or more security operations selectively enabled on the programmable integrated circuit device, and the first set of security feature settings is enabled in the device prior to the device receiving the configuration data.

10. The method of claim 9, wherein the test access port is a Joint Test Action Group (JTAG) port.

11. The method of claim 9, wherein the method is implemented using a non-transitory computer readable medium that is licensed to an end user by a manufacturer of the programmable integrated circuit device.

12. The method of claim 9 further comprising:
validating a user of the computer readable medium prior to receiving security requirement data to the test access port.

13. A programmable integrated circuit device comprising:
an input for receiving configuration data for the programmable integrated circuit device;
a test access port;
control circuitry configured to:
    read security requirement data provided to the test access port of the programmable integrated circuit device,
    compare the security requirement data against a value stored in a non-volatile memory, the value representing a first set of security feature settings enabled in the programmable integrated circuit device and the security requirement data representing a second set of security feature settings required on the programmable integrated circuit device, and
    configure the programmable integrated circuit device according to configuration data provided to the configuration input in response to a determination that the value stored in the non-volatile memory is compatible with the security requirement data, wherein the first set of security feature settings comprises one or more security operations selectively enabled on the programmable integrated circuit device, and the first set of security feature settings is enabled in the device prior to the device receiving the configuration data.

14. The programmable integrated circuit device of claim 13, wherein the test access port is a Joint Test Action Group (JTAG) port.

15. The programmable integrated circuit device of claim 13, wherein the security requirement data is provided by a processor executing a method provided by a non-transitory computer readable medium that is licensed to an end user by a manufacturer of the programmable integrated circuit device.

16. The programmable integrated circuit device of claim 13, wherein the logic circuitry is further configured to:
validate a user of the computer readable medium prior to providing security requirement data to the test access port.

17. A non-transitory machine-readable data storage medium encoded with non-transitory machine-executable instructions, said instructions comprising:
instructions to store a value of at least one bit in a non-volatile memory of a programmable integrated circuit device, the value representing a first set of security feature settings enabled in the programmable integrated circuit device;
instructions to compare the value stored in the non-volatile memory against security requirement data, wherein the security requirement data is included in configuration data for the programmable integrated circuit device and represents a second set of security feature settings required by the configuration data on the programmable integrated circuit device; and
instructions to configure the programmable integrated circuit device with the configuration data in response to a match between the value stored in the non-volatile memory and the security requirement data, wherein the first set of security feature settings comprises one or more security operations selectively enabled on the programmable integrated circuit device, and the first set of security feature settings is enabled in the device prior to the device receiving the configuration data.

18. The non-transitory machine-readable data storage medium of claim 17 further comprising instructions to identify a match between the value stored in the non-volatile memory and the security requirement data when the value stored in the non-volatile memory indicates that JTAG ports associated with the programmable integrated circuit device are disabled.

19. The non-transitory machine-readable data storage medium of claim 17 further comprising instructions to identify a match between the value stored in the non-volatile memory and the security requirement data when the value stored in the non-volatile memory indicates that a test mode of the programmable integrated circuit device is disabled.

20. The non-transitory machine-readable data storage medium of claim 19 further comprising instructions to identify a match between the value stored in the non-volatile memory and the security requirement data when the value stored in the non-volatile memory indicates that a test mode of the programmable integrated circuit device has not been previously enabled.

21. A field-programmable gate array (FPGA), comprising:
   an input for receiving configuration data for the FPGA, the configuration data including security requirement data; and
   control circuitry configured to:
      compare a value against the security requirement data, wherein the value is represents a first set of security feature settings enabled in the FPGA and the security requirement data represents a second set of security feature settings required on the programmable integrated circuit device by the configuration data, and
      configure the FPGA with the configuration data in response to a match between the value and the security requirement data, and wherein the first set of security feature settings comprises one or more security operations selectively enabled on the FPGA, and the first set of security feature settings is enabled in the FPGA prior to the FPGA receiving the configuration data.

22. The FPGA of claim 21, wherein the control circuitry is further configured to identify a match between the value and the security requirement data when the value indicates that JTAG ports associated with the FPGA are disabled.

23. The FPGA of claim 21, wherein the control circuitry is further configured to identify a match between the value and the security requirement data when the value indicates that a test mode of the FPGA is disabled.

24. The FPGA of claim 23, wherein the control circuitry is further configured to identify a match between the value and the security requirement data when the value indicates that a test mode of the FPGA has not been previously enabled.

25. A non-transitory machine-readable data storage medium encoded with non-transitory machine-executable instructions, said instructions comprising:
   instructions for receiving security requirement data at a test access port of a programmable integrated circuit device, wherein the programmable integrated circuit device is configured to compare the security requirement data to a value stored in a non-volatile memory of the programmable integrated circuit device, the value representing a first set of security feature settings enabled in the programmable integrated circuit device and the security requirement data representing a second set of security feature settings required on the programmable integrated circuit device; and
   instructions for receiving configuration data at a configuration input of the programmable integrated circuit device responsive to a determination that the value stored in the non-volatile memory is compatible with the security requirement data, wherein the first set of security feature settings comprises one or more security operations selectively enabled on the programmable integrated circuit device, and the first set of security feature settings is enabled in the device prior to the device receiving the configuration data.

26. The non-transitory machine-readable data storage medium of claim 25, wherein the test access port is a Joint Test Action Group (JTAG) port.

27. The non-transitory machine-readable data storage medium of claim 25, wherein the non-transitory machine-readable data storage medium is licensed to an end user by a manufacturer of the programmable integrated circuit device.

28. The non-transitory machine-readable data storage medium of claim 25 further comprising instructions for validating a user of the computer readable medium prior to receiving security requirement data to the test access port.

29. A field-programmable gate array (FPGA), comprising:
   an input for receiving configuration data for the FPGA;
   a test access port;
   control circuitry configured to:
      read security requirement data provided to the test access port of the FPGA,
      compare the security requirement data against a value, the value representing a first set of security feature settings enabled in the FPGA and the security requirement data representing a second set of security feature settings required on the programmable integrated circuit device, and
      configure the FPGA according to configuration data provided to the configuration input in response to a determination that the value is compatible with the security requirement data, wherein the first set of security feature settings comprises one or more security operations selectively enabled on FPGA, and the first set of security feature settings is enabled in the FPGA prior to the FPGA receiving the configuration data.

30. The FPGA of claim 29, wherein the test access port is a Joint Test Action Group (JTAG) port.

31. The FPGA of claim 29, wherein the security requirement data is provided by a processor executing a method provided by a non-transitory computer readable medium that is licensed to an end user by a manufacturer of the FPGA.

32. The FPGA of claim 29, wherein the logic circuitry is further configured to:
   validate a user of the computer readable medium prior to providing security requirement data to the test access port.

33. The programmable integrated circuit device of claim 1, wherein the first set of security feature settings represents a selection from a set of different possible device security feature settings, wherein selected security feature settings in the selection are enabled on the programmable integrated circuit device and non-selected security feature settings not in the selection are not enabled on the programmable integrated circuit device.

* * * * *